Patented Sept. 8, 1925.

1,552,625

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

PROCESS OF MAKING MOLDED FIBER ARTICLES.

No Drawing. Application filed April 10, 1923. Serial No. 631,211.

*To all whom it may concern:*

Be it known that we, CHAUNCEY C. LOOMIS and HORACE E. STUMP, citizens of the United States, residing in Yonkers, Brooklyn, in the counties of Westchester, Kings, and State of New York, have invented a new and useful Improvement in Processes of Making Molded Fiber Articles, of which the following is a specification.

This invention relates in general to the production of molded fiber articles, as for example, articles molded of wood fiber, leather fiber, etc., and has for its object the provision of molded articles of greatly increased strength, greatly increased power to resist water and more readily workable, less likely to crack than those previously in use.

A further object of the invention is the provision of material of the character described, which will possess better molding qualities. Our invention contemplates the application of a latex with rubber, gutta percha, balata and the like to the fibrous material prior to their incorporation in the mass to be compressed and a coagulation of the latex to deposit the rubber particles directly upon and surrounding the individual fibers of the material. The latex, if desired, may be partially coagulated first with any of the usual rubber coagulants, as acetic acid, mineral acid, formic acid, alum or salts of the alkaline earth metals, etc., whereupon the latex is converted into the form of a viscous paste, which, when mixed with the shredded fibers, coats them and on pressing the materials in the forming of the articles the moisture can be driven off and the materials set to rubber. If desired rubber compounding materials may be incorporated in the latex prior to its coagulation and the finished product vulcanized. It is desired that the latex be partially coagulated before treating the fiber particles, since it has been discovered that after partial coagulation the rubber contents of the latex has greater affinity for the fiber particles and effects more readily their coating. This partial coagulating may be readily accomplished by the use of any of the usual latex coagulants as acetic acid, mineral acid, formic acid, alum or salts of the alkaline earth metals, etc., care being taken to only add a sufficient quantity of the coagulant to give a partial coagulation of the latex.

Partial coagulation of the latex is a matter of controlling the quantity of coagulant, and is largely empirical. Thus, the amount of coagulating material will vary over rather wide limits according to the ammonia content of the latex, and the time which has elapsed between the gathering of the latex and its use in the process. We have obtained the desired result by adding 10 cc of 10% solution of zinc acetate to 100 cc of latex and then adding 1 cc of ½% solution of acetic acid.

The same result, i. e., agglutinated or partially coagulated latex, may be obtained as follows:

To one hundred parts of latex by volume, add 32 to 34 parts by volume of a ten per cent solution of aluminum sulfate. This should be added slowly, with vigorous stirring at a temperature of about 25° C. The material sets to a cheese-like mass, which is plastic but not elastic. It can be spread with a knife, like butter, which is impossible when coagulation is complete. A weight dropped on the mass will not rebound from it.

We claim:

1. The process of making molded fiber articles, which comprises treating fiber with a natural latex partially coagulating the same and molding the articles.

2. The process of making molded fiber articles, which comprises treating fiber with a natural latex partially coagulating the same, molding the articles, and vulcanizing.

3. The process of making a molded fiber article, which comprises the making of a mixture of fiber and partially coagulated latex, molding the article from such mixture, and completing the coagulation.

CHAUNCEY C. LOOMIS.
HORACE E. STUMP.